Figure 1:
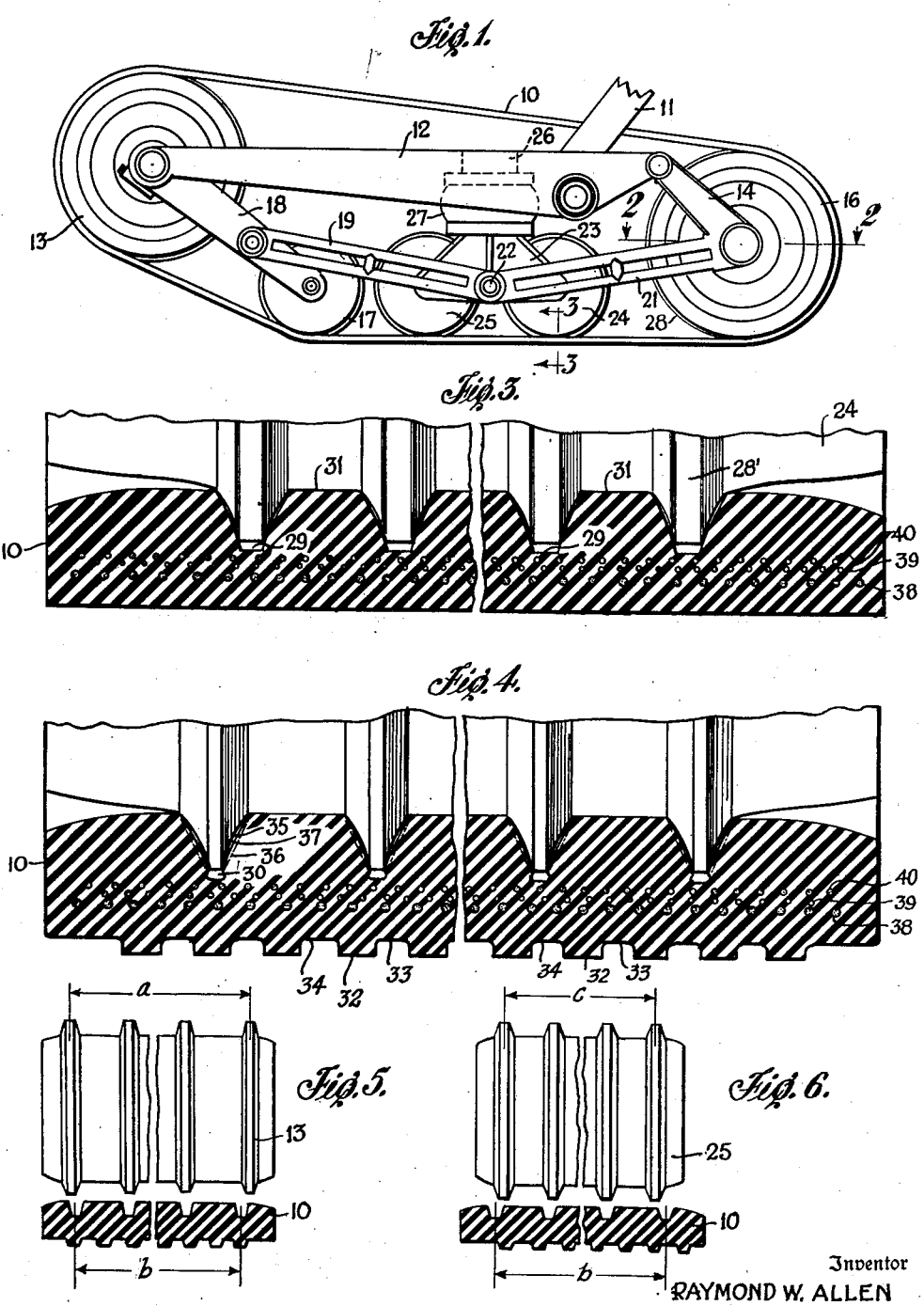

July 29, 1952     R. W. ALLEN     2,605,146
ENDLESS TRACK LANDING GEAR FOR AIRCRAFT
Filed Sept. 13, 1949     2 SHEETS—SHEET 2

Inventor
RAYMOND W. ALLEN
By Ely & Frye
Attorneys

Patented July 29, 1952

2,605,146

UNITED STATES PATENT OFFICE 2,605,146

ENDLESS TRACK LANDING GEAR FOR AIRCRAFT

Raymond W. Allen, Akron, Ohio, assignor to The Firestone Tire & Rubber Company, Akron, Ohio, a corporation of Ohio Application September 13, 1949, Serial No. 115,341

12 Claims. (Cl. 305—8)

This invention relates to an endless track type of landing gear for aircraft and has to do with improvements therein to provide for cushioning the landing shocks incident to the greatly increased landing speeds now prevalent, without undue wear or friction in the track or dislocation thereof.

In my prior Patent No. 2,459,737, I have described a tracklaying landing gear in which a belt comprising V sections in multiple is trained over the various bogey drums of the landing carriage, and cooperates with the shock-absorbing structure of the carriage to effect a landing on rough terrain, if necessary, without mishap, without undue friction or wear or failure in the belt, and without side slip.

In the use of multiple rib endless tracks for aircraft landing gear, the problems encountered present outstanding differences from those incident to machinery belting of the so-called V type. In the use of the latter, friction is no problem since the belts are adjusted to a value which is just sufficient for the torque required and remains substantially constant, such belts seldom, if ever, contacting the bottom of the pulley groove. Furthermore, the problem of side slip is minor, if present at all, and the belt is not subjected to loading on its outer surface. All of these factors are vital in the case of the landing gear track, which is subjected to tremendous shocks, must be prepared to resist sidewise forces, and in which friction must be kept to a minimum, even when the track is under very high tensions, with the result that contact on the slant sides only of a roller groove is not practicable.

It is highly desirable in tracks of this nature that the belt be kept in tension to the highest degree feasible in order to ensure its retention on the bogeys and to afford an incline on which the bogeys may ride when unusually large obstacles are encountered in a landing run, rather than to have the load carried on the lower bogey wheels as separate elements. High tension is also desirable for braking purposes. In prior designs, high tension in the belt would be attended with so much friction as to engender damaging heat and/or wear in passing around the radius of the bogey grooves, and required so much energy in general in moving the track as to lower the ability of the landing gear to accommodate high landing speeds.

Landing speeds have gradually increased from about 60 miles per hour to a present demand of 160 miles per hour. Since landing shocks will, in general, increase as the square of the speed, this must be compensated in the shock-withstanding capacity of the landing gear. Adoption of thicker belts would seem to be a requisite but such expedient would tend to hamper the proper functioning of the belt in passing over the bogey drums and malfunctioning and failures would result. With a belt according to the present invention, it is possible to use, for moderate speeds, a thickness less than has been heretofore employed, or to employ a belt of no greater thickness than heretofore employed, even when landing speed demands are considerably increased. These results and others are made possible in part by so constructing the track that most shocks on the belt tend to be transmitted through the maximum thickness thereof in preference to regions of lesser thickness.

It is therefore an object of the invention to provide an endless track for landing gear which will stand up under increased landing speeds. Another object is to provide a belt for landing gear which will absorb shocks due to such higher speeds without increase in the thickness of the belt, a related object being to provide for increased tension in the belt without undue friction in the bogey drum grooves resulting. Still another object is to provide a combination of track and bogey roller grooves which will minimize crowding and friction therebetween. Other objects in general are to transmit most shocks through the maximum thickness of the track, provide a ground tread on the track correlated to such result, eject small obstacles from the track tread, provide for proper spacing in the bogey drum grooves to allow for varying spacing of the track ribs at different regions of its cycle, and to minimize tendency toward side slip.

Figure 2:
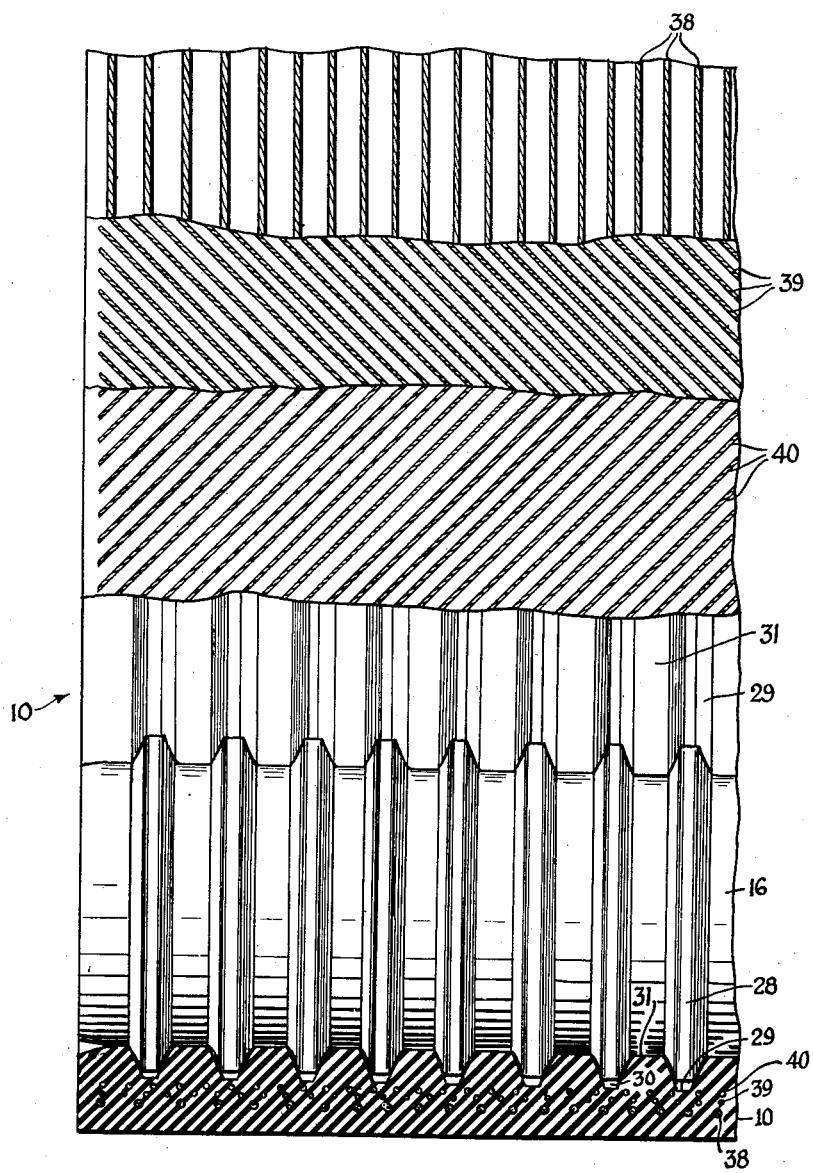

These and other ends are attained by the invention, certain forms of which are described in the following specification and illustrated in the drawings, in which:

Fig. 1 is a side elevation of a landing carriage with endless track,

Fig. 2 is an enlarged view along the line 2—2 of Fig. 1, showing a section of the portion of the track curved around the roller, the inside of the track in step backs to show internal construction, and showing the bogey roller in elevation, Fig. 3 is an enlarged, fragmentary, sectional view taken on the line 3—3 of Fig. 1, Fig. 4 is a view similar to Fig. 3 showing a track having ground-engaging treads.

Fig. 5 is an elevational view of one of the bogey rollers around which the track curves, lying adjacent to, but spaced from, an untensioned belt (shown in section) to show the difference in rib spacing, and Fig. 6 is a view similar to Fig. 5 showing a similar relation respecting one of the bogey rollers to which the track is normally tangent.

Referring to Fig. 1, there is shown a landing gear comprising a series of five drums or rollers surrounded by an endless track 10, and integrated by a linkage permitting shifting of the relative positions of the various rollers under the forces encountered in landing. The general construction of the gear as a whole is set forth in my aforesaid patent and reference is made thereto for specific details. It suffices here to say that the linkage, which connects to the aircraft body through members 11, comprises an upper toggle with a long arm 12 pivoted to the shaft of a large upper roller 13 and a short arm 14 pivoted to the shaft of a large ground contact roller 16. Roller 13 connects with a small ground contact roller 17 through an arm 18, and the latter is connected to the rear roller 16 through a toggle having arms 19, 21 whose common pivot 22 is carried on a truck 23 supporting a pair of rollers 24, 25 and attached to a cross-piece 26 between arms 12 by an air spring bellows 27. The belt or track 10 is not necessarily in tension prior to landing but, as pointed out in the specification of the aforesaid patent, is subjected to relatively high tension after ground contact due to the shift in arrangement of the linkages. The problem of moving a thick track around a roller while under tension is most acute in the cases of rollers 13 and 16, somewhat less in the case of roller 17, and still less in the case of rollers 24, 25.

As to the problem of damage to the track due to being engaged between a roller and the ground, it is most pronounced in the case of rollers 16 and 17, and is appreciable in the case of rollers 24 and 25, but seldom if ever enters in the case of roller 13.

It is, of course, understood that a shock will tend to dissipate itself within a rubber body if the latter is of sufficient depth to cushion the shock in the time interval available. In the case of an endless track landing gear this expedient is not available by reason of the limitations imposed on track thickness by the radius of flexure involved and considerations of space in the bogey roller grooves. As a chain is as strong as its weakest link, so the capacity of a rubber cushion to absorb shock is measured by the shortest dimension of the cushion in the direction of applied force. Heretofore, the landing gear tracks have, in their untensioned state, had a substantially complementary fit in the bogey roller grooves, contacting or nearly contacting all surfaces thereof, and therefore were, in general, able to absorb shock without failures to an extent governed only by the minimum thickness of the track, that is from the ground-engaging portion to the outer surface of the ribs of the rollers. Referring to Fig. 2, it will be seen that the present track and roller are so related in dimensions that the outer rim of the bogey roller ribs 28 are of less diameter than the mating grooves 29 on the inside of the track so as to have a radial clearance 30, and this is the case even with the track under working tension.

Any squeezing of the track between the ground and the roller will be resisted only in the regions under the grooves of the bogey roller, the shock being transmitted considerably diminished over that heretofore transmitted through the minimum thickness of track to the peripheries of the roller ribs. Thus, the shocks are absorbed in a much more efficient manner than heretofore without undue punishment and consequent wear in the critical, thin sections of the track, and greater loads can be dissipated without increasing track thickness.

The marginal edges of the ribs 28 are preferably rounded to reduce tendency to cut into the rubber.

If it is desired to provide the outside of the track with a tread pattern, the foregoing advantages may be retained and even improved by an arrangement such as shown in Fig. 4. Here, the tread ribs 32 are provided by grooving the outside of the track as at 33 directly under the inner ribs 31 of the track and as at 34 directly under the grooves 29 of the track. It will be seen that by providing the grooves 34 the chances of deforming the track at its thinnest point are even further lessened, and the provision of groove 33 does not sensibly detract from the abiilty of the track to carry the shock load in the region of the track under its inner rib 31. In any event, the grooves 33 may be omitted, in which case the tread pattern will be defined by grooves 34 only. The grooves, especially 34, possess a further advantage in that they will flex laterally of the track and eject objects picked up in the travel of the track.

A careful study of the behavior of the track in passing over the rollers indicates that a pinching of the track ribs may occur which results in undue wear of the track ribs. Therefore, the bogey roller ribs are formed with sides generally concave to the roller troughs, as indicated at 35 (Fig. 4), the straight sides of the inner track ribs in the unstressed condition of the track, as shown at 36 in dotted lines, being unmodified. This results in a roller and track combination having a rib side wall clearance as well as the clearance 30 at the bottom, discussed above. This provides a space for accommodation of rubber rearranged by flow in the track rib due to its curving around the rollers, or due to the weight of the plane, or both. The concave side wall possesses a still further and important advantage in that it provides near the outer extent of the roller rib, a wall which is nearly perpendicular to the roller axis, so that the track ribs have less tendency to climb the side of the roller rib and slip off, upon encountering laterally directed forces.

For uses such as those of the present invention, involving high tensions and sharply varying load conditions throughout each cycle, it is imperative that the track have reinforcing elements with relatively low elongation, the steel wires 38, for instance, arranged longitudinally of the track (Fig. 2). However, these alone may not lend sufficient rigidity laterally of the track and, therefore, the track, when subjected to side forces, may be thrown off. The provision of crossed, diagonal wires corrects this defect since it further stiffens the rubber body and lessens the tendency to deform laterally.

It will be noted, in Fig. 3, that the rims 28' of the ribs of roller 24 are somewhat wider than those of ribs 28 of roller 16. This is possible because of the lower degree of lateral spreading in the case of rollers which the track engages tangentially and where, therefore, spreading is due only to the weight of the craft.

The arrangement of reinforcing wires is shown in Fig. 2. These comprise the layer of parallel wires 38, arranged longitudinally of the track and near the outer surface, and an inner system of a pair of closely adjacent layers of wires, each of the latter layers having parallel wires 39, 40 angularly disposed to the wires 38, and each having its angular disposition in an opposite sense. Preferably, the wires 39, 40 are disposed at a 45° angle, and the layer 38 and the system of layers 39, 40 are disposed, respectively, on opposite sides of the neutral bending axis of the track section.

Heretofore, it has been customary to provide a spacing of the bogey roller ribs which is identical with the rib spacing of the track in its cured but untensioned and otherwise undeformed condition. With such an arrangement and under the increased demands on the track due to the higher speeds, the diagonal reinforcing wires are not only broken at various places throughout the track, but actually work their way out of the track so that the broken ends protrude from the track.

A consideration of the behavior of the track in passing over the various rollers will afford, at least in part, an explanation for such breakdown. Obviously the track cannot be cured in a form adapted for each of the various conditions of deformation encountered in passing around the rollers. At best, only a compromise is possible. For instance, it may be cured so that it is unstressed only when flat and will always be stressed when curved, or it may be cured in circular form so that it will be stressed when flat or subject to any curvature other than its normal circular curvature. In either case, curvatures attained by the track on the bogey rollers will result in a spreading of the inner face of the track over and above the track width as it exists in the straight portions thereof.

Assuming, then, that the bogey rollers have a rib pitch corresponding to the rib pitch of the unstressed track, and considering the roller 13, the track ribs will tend to spread as they pass over the roller and will be subjected to wear by the consequent pressure on the sides of the roller ribs. This effect is zero at the center line of the belt and increases progressively outward therefrom, and it has been noted that the track, in its tendency to move outward, even creeps up the roller ribs, the wear in the track ribs being more apparent in the upper portion thereof.

In passing over the roller 17, this condition in the track will persist in some degree, depending upon the curvature, but since little or no curvature is encountered under rollers 24 and 25, the inner part of the track, after leaving roller 17, will tend to resume the lesser width as in the upper flat portion of the track. In the case where the track is cured in circular form, this width will be somewhat less than normal—about ¼ inch total change in width for a track 19 inches wide. As a mean value, the increase in width above normal in the track when curving around the rollers is about ⅛ inch.

When the bogey rollers were constructed with a rib spacing appropriate to the above changes in width it was found that the track performance at higher speeds was considerably improved, having reference to resistance to wear in the track, breakdown of the reinforcing members, and ability of the track to remain on the rollers. In particular, the individual rib spacing on rollers 13, 16 and 17 was increased 0.005 inch over that of the unstressed track, and the rib spacing on rollers 24, 25 was decreased 0.010 under that of the unstressed track.

The rib spacing of two typical rollers in comparison with groove spacing in an untensioned track is shown in Figs. 5 and 6. In the former, the roller 13, around which the track is sharply curved in service, is shown in proximity to a portion of a track 10, the track as a whole being in circular form, as cured, and therefore being unstressed. It will be seen that the total span of bogey roller rib centers, indicated as $a$, is greater than the total span $b$ of track groove centers. However, when the track is curved around roller 13, as in Fig. 1, the ribs and grooves of each will exactly mate without crowding or binding.

In Fig. 6 the span $c$ of the ribs of roller 25 is less than the span $b$ of the untensioned track. When the circular track is flattened as on the bottom in Fig. 1, the groove spacing of the track will be reduced and it will be still further reduced if the track is elongated due to tension. The total effect is to bring the track groove span into equality with the span $c$ of the bogey roller.

Obviously the particular values of spacing corrections apply to the case given and will vary with any of several different factors such as track material, type of reinforcement, amount of track elongation, size of rollers, shape of the track as cured, etc. However, each case will find a ready solution in the light of the concept of this invention whereby roller rib spacing is adjusted throughout the system and differs from the groove spacing of the track in an unstressed state.

It has been found possible to eliminate ribs entirely from bogey rollers such as 24 and 25, the ribs on the rest of the bogey rollers being adequate to retain the track against side slip. Hence all problems of track fitting may be eliminated as to these rollers, and the invention contemplates such an arrangement as within its scope.

While certain embodiments of the invention have been shown and described, the invention is not limited thereto since various changes in the precise size, shape, character, and location of the parts, for instance, may be made without departing from the spirit or scope of the appended claims.

What is claimed is:

1. In a tracklaying landing gear for aircraft, in combination, a bogey roller having annular ribs and grooves and an endless track having inner ribs and grooves complementary to those of the said roller, the extreme inner surfaces of the ribs of said track contacting the bottoms of the respective grooves of the roller, the bottoms of the grooves of said track being spaced from the extreme outer surfaces of the ribs of said roller, and a tread pattern on the outside of said track comprising longitudinal grooves aligned with the inner grooves in said track.

2. An endless track for use with a tracklaying landing gear for aircraft, comprising longitudinal ribs and grooves on its inner side, and a tread pattern on its outer side comprising longitudinal grooves aligned with the inner grooves in said track.

3. In a tracklaying landing gear for aircraft, a series of bogey rollers having ribs and grooves surrounded by an endless track under tension and having ribs and grooves adapted to mate with those of the rollers while engaging some of the rollers tangentially and others arcuately, the rollers which the track engages tangentially having their ribs spaced apart a distance less than those of the untensioned track, and the rollers which the track engages arcuately having their ribs spaced apart a distance greater than those of the unstressed track.

4. In a tracklaying landing gear for aircraft, a series of bogey rollers having ribs and grooves surrounded by an endless track under tension having ribs and grooves adapted to engage those of the rollers, part of said rollers having their ribs spaced apart a distance less than those of the untensioned track, and others of said rollers having their ribs spaced apart a distance greater than those of the untensioned track.

5. In a tracklaying landing gear for aircraft, a series of bogey rollers having ribs and grooves surrounded by an endless track under tension, said track having longitudinally extending reinforcing wires and crossed, diagonal reinforcing wires, and having ribs and grooves adapted to mate with those of the rollers while engaging some of the rollers tangentially and others arcuately, the rollers which the track engages tangentially having their ribs spaced apart a distance less than those of the untensioned track, and the rollers which the track engages arcuately having their ribs spaced apart a distance greater than those of the untensioned track.

6. In a tracklaying landing gear for aircraft, a carriage comprising a plurality of ribbed bogey rollers, a ribbed endless track surrounding the rollers, the rib spacing of at least one of said bogey rollers being greater than the rib spacing of said track in its untensioned state, and the rib spacing of at least one of said bogey rollers being less than the rib spacing of the said track in its untensioned state.

7. In a tracklaying landing gear for aircraft, a carriage comprising a plurality of ribbed bogey rollers, a ribbed endless track surrounding the rollers, the rib spacing of at least one of said bogey rollers being less than the rib spacing of said track in its untensioned state.

8. In a tracklaying landing gear for aircraft, a carriage comprising an endless flexible track, front and rear bogey rollers with which the track is in circumferential contact, and a plurality of intermediate bogey rollers located between the front and rear bogey rollers with which the track is in tangential relation, the track being provided with spaced longitudinal grooves on its inner surface, all of said bogey rollers having spaced ribs mating with said grooves, the ribs on the front and rear bogey rollers being spaced at greater distances than the normal spacing of the mating grooves on the track, and the ribs on the intermediate bogey rollers being spaced at lesser distances than the spacing of the ribs on the front and rear bogey rollers.

9. In a tracklaying landing gear for aircraft, a carriage comprising an endless flexible track, front and rear bogey rollers with which the track is in circumferential contact, and a plurality of intermediate bogey rollers located between the front and rear bogey rollers with which the track is in tangential relation, the track being provided with spaced longitudinal grooves on its inner surface, all of said bogey rollers having spaced ribs mating with said grooves, ribs on the intermediate bogey rollers being spaced at lesser distances than the spacing of the mating grooves on the track when the track is in untensioned condition.

10. In a tracklaying landing gear for aircraft, in combination, a bogie roller having a plurality of annular, flat-topped ribs with concave sides and flat-bottomed grooves and an endless track having straight-sided inner ribs and grooves adapted to interengage with those of the roller, the extreme inner surfaces of the ribs of said track contacting the bottoms of the respective grooves of the roller and the bottoms of the grooves of said track being spaced from the tops of the respective ribs of said roller.

11. In a tracklaying landing gear for aircraft, in combination, a bogie roller having a plurality of annular, flat-topped ribs with concave sides and flat-bottomed grooves and an endless track having straight-sided inner ribs and grooves adapted to interengage with those of the roller, whereby a clearance is normally present between the side walls of the track ribs and the side walls of the roller ribs.

12. In combination, a bogie wheel for landing gear for aircraft, said wheel having a plurality of ribs and grooves, and a flexible track having ribs and grooves mating with the ribs and grooves of said wheel, said wheel having marginal end portions arranged in diverging relation to the corresponding side margins of said track.

RAYMOND W. ALLEN.

REFERENCES CITED

The following references are of record in the file of this patent:

UNITED STATES PATENTS

| Number | Name | Date |
| --- | --- | --- |
| 1,818,798 | Freedlander | Aug. 11, 1931 |
| 2,055,932 | Kitchen | Sept. 29, 1936 |
| 2,476,828 | Skromme | July 19, 1949 |
| 2,494,065 | Slemmons | Jan. 10, 1950 |